(12) United States Patent
Dauteuil et al.

(10) Patent No.: US 9,118,757 B2
(45) Date of Patent: Aug. 25, 2015

(54) SYSTEM AND METHOD FOR MAPPING A PRIVATE BRANCH EXCHANGE SYSTEM

(71) Applicant: BSJD, LLC, Liverpool, NY (US)

(72) Inventors: Joseph Dauteuil, Eugene, OR (US); Stuart Groom, King Ferry, NY (US)

(73) Assignee: BSJD, LLC, Liverpool, NY (US)

( * ) Notice: Subject to any disclaimer, the term of this patent is extended or adjusted under 35 U.S.C. 154(b) by 0 days.

(21) Appl. No.: 14/465,218

(22) Filed: Aug. 21, 2014

(65) Prior Publication Data

US 2015/0055771 A1 Feb. 26, 2015

Related U.S. Application Data

(60) Provisional application No. 61/868,228, filed on Aug. 21, 2013.

(51) Int. Cl.
*H04M 3/00* (2006.01)
*H04M 3/42* (2006.01)
*G06F 17/30* (2006.01)

(52) U.S. Cl.
CPC ..... *H04M 3/42314* (2013.01); *G06F 17/30598* (2013.01); *G06F 17/30864* (2013.01)

(58) Field of Classification Search
USPC ................ 379/196, 197, 198, 234, 221.15
See application file for complete search history.

(56) References Cited

U.S. PATENT DOCUMENTS

| 6,014,377 | A  | * | 1/2000  | Gillespie ............... 370/351 |
| 6,330,448 | B1 | * | 12/2001 | Otsuka et al. ............ 455/436 |
| 2005/0210235 | A1 | | 9/2005 | Best |
| 2007/0195943 | A1 | | 8/2007 | Freeny |

FOREIGN PATENT DOCUMENTS

KR 1020100089534 8/2010

* cited by examiner

*Primary Examiner* — Quynh Nguyen
(74) *Attorney, Agent, or Firm* — George R. McGuire; Bond Schoeneck & King, PLLC

(57) ABSTRACT

A system and method for mapping a private branch exchange is provided whereby a visual representation of a private branch exchange is graphically displayed. Once the PBX is mapped, a user can then make changes to the connections and other data in the branch exchange and save those changes such that the PBX will then follow the edited structure.

8 Claims, 7 Drawing Sheets

SAMPLE DATA FROM BROADSOFT

1. Sample Request For List Of Numbers

```
<?xml version="1.0" encoding="ISO-8859-1"?>
<BroadsoftDocument protocol="OCI" xmlns="C" xmlns:xsi="http://www.w3.org/2001/XMLSchema-instance">
  <sessionId xmlns="">67B10D1D2A78753BF1DD2C740AD7413F</sessionId>
  <command xsi:type="GroupDnGetAssignmentListRequest" xmlns="">
    <serviceProviderId>AVADTE080813</serviceProviderId>
    <groupId>amac</groupId>
  </command>
</BroadsoftDocument>
```

2. Sample Response For List Of Numbers

```
<?xml version="1.0" encoding="ISO-8859-1"?>
  <BroadsoftDocument protocol="OCI" xmlns="C" xmlns:xsi="http://www.w3.org/2001/XMLSchema-instance">
  <sessionIdxmlns="">192.168.1.151,577932,1350845960062 </sessionId>
  <command echo="" xsi:type="GroupDnGetAssignmentListResponse" xmlns="">
    <dnTable>
      <colHeading>Phone Numbers</colHeading>
      <colHeading>Assigned To</colHeading>
      <colHeading>Department</colHeading>
      <colHeading>Activated</colHeading>
      <row>
        <col>+1-4052360000</col>
        <col>Reverse Mortgage (Call Center)</col>
        <col/>
          <col>true</col>
      </row>
```

FIG. 6

SAMPLE DATA AFTER CHANGES

1. Sample "All Objects"

{"status":"ok", "datetime":"1366672075166",
"content":{"amac.campaign.lifelngtrmcare.cc01":{"mediaOnHoldInternalSource":{"externalAudioSource":""/,,video
MessageSourceSelection":"Default,","externalVideoSource":","audioMessageSourceSelection":"Default"}"supervi
sors":[{"lastName":"Weber","callingLineIdLastName":"Weber","staticRegistrationCapable":"","department":"","hir
aganaLastName":"Weber","emailaddress":"","display":"Weber,
Rebecca","defaultAlias":"rebecca. weber@as.commx.net","inTrunkGroup":false,"useDomain":false,"type":"user"/"t
imeZoneDisplayName":"(GMT-04:00)
US/Eastern"/"linePort":"","extension":"1006","callingLineIdPhoneNumber":"8139837869","phoneNumber":"+1-
8137924815
","userId":"rebecca.weber","language":"English","phoneNumberActivated":"true","firstName":"Rebecca","callingLi
neIdFirstName":"Rebecca","hiraganaFirstName":"Rebecca","key":"rebecca.weber"}

2. Sample "Call Flow"

{"nodes":[{"id":"amac","category":"group","loop":false,"path":"amac","display":"Association of Mature American
Citizens","type":"group","key":"amac","tooltip":""},{"id":"8133974959","category":"number","loop":false,"path":"
amac||8133974959","display":"(813) 397-
4959","type":"number","key":"amac||8133974959","tooltip":""},{"id":"velapointunder65","category":"Standard",
"loop":false,"path":"amac||8133974959||velapointunder65","fdisplay":"VelaPoint Under
65","type":"Standard","key":"amac||8133974959||velapointunder65","tooltip":""},{"id":"agents","category":"age
nts","loop":false,"path":"amac||8133974959||velapointunder65||agents","display":"Agents","type":"agents","ke
y":"amac||8133974959||velapointunder65||agents","tooltip":"The Agents assigned to the Call Center"}

3. Sample "Details"

{"users":[{"lastName":" Workstation 01","callingLineIdLastName":" Workstation
01","staticRegistrationCapable":"","department":"","hiraganaLastName":" Workstation
01","emailAddress":"","display":"Workstation 01, Lady
Lake","defaultAlias":"amac.ladylake.workstation01@as.commx.net","inTrunkGroup":false,"useDomain":false,"typ
e":"user","timeZoneDisplayName":"(GMT-04:00)
US/Eastern","linePort":"","extension":"2019","callingLineIdPhoneNumber":"6315896675","phoneNumber":"","use
rId":"amac.ladylake.workstation01","language":"English","phoneNumberActivated":"","firstName":"Lady
Lake","callingLineIdFirstName":"Lady Lake","hiraganaFirstName":"Lady
Lake","key":"amac.ladylake.workstation01"}

FIG. 7

SYSTEM AND METHOD FOR MAPPING A PRIVATE BRANCH EXCHANGE SYSTEM

CROSS REFERENCE TO RELATED APPLICATIONS

The present application relates and claims priority to U.S. Provisional Patent Application, Ser. No. 61/868,228, filed Aug. 21, 2013, the entirety of which is hereby incorporated by reference.

BACKGROUND OF THE INVENTION

1. Field of the Invention

The present invention relates generally to private branch exchange systems, and more particularly to such systems that map and display the structure of private branch exchange systems.

2. Description of the Related Art

Private branch exchange systems are ubiquitous in office spaces, buildings, and corporations. These systems are often managed by a hosted PBX system. However, hosted PBX systems offer no visual aid for user to understand the structure of the private branch exchange. Rather, understanding the layout of a private branch exchange may be a difficult and tedious task. As a result, managing a private branch exchange in an office building is complex and time-consuming. Accordingly, there is a need in the art to provide a user with a simple visual representation of a private branch exchange, so the user can quickly understand the structure of a private branch exchange and easily make any necessary changes.

SUMMARY OF THE INVENTION

The present invention provides a system and method for mapping a private branch exchange. By providing a visual representation of a private branch exchange, the process for making changes to the PBX is made easier and may be done quickly and accurately.

In accordance with an embodiment of the present invention, a system for mapping a hosted private branch exchange is provided. The system generally comprises a first database in which data representative of the hosted private branch exchange is stored. A communications module permits a user to request data from this first database, and a second database stores the data that was requested from the first database. The requested data comprises data representative of, for example, phone numbers, users, auto attendants, hunt groups, call centers, and physical phones and devices. A database management module provides the functions of: parsing and storing the data requested from the first database into first and second categories, wherein the second category comprises at least five distinct categories in which objects representative of predetermined data are assigned; the function of generating call paths between said objects; the function of generating logical connections between the objects; the function of creating directional relationships between pairs of said objects; and the function of generating an interactive map. A graphical interface is further provided that is in communication with the database and adapted to provide a visual representation of said interactive map on a display, thereby permitting the user to visually see the PBX and be able to make changes to it as necessary.

Another aspect of the present invention provides a method for mapping a private branch exchange the data representative of which is stored in a first database. The method generally comprise the steps of: requesting data from the first database and storing the requested data in a computer readable second database. The data is then parsed and stored into first and second categories, wherein the second category comprises at least five distinct categories in which objects representative of predetermined data are assigned. Call paths are then generated between the objects and logical connections are also generated between the objects. Based on these connections, directional relationships between pairs of said objects are then established. An interactive map is then constructed based on the objects and their connections and relationships. A graphical interface is provided that is in communication with the second database and adapted to provide a visual representation of the interactive map on a display. A user can therefore use the graphical interface as a tool to see and edit if necessary the PBX, with any edits made being saved to the database.

BRIEF DESCRIPTION OF THE SEVERAL VIEWS OF THE DRAWINGS

The present invention will be more fully understood and appreciated by reading the following Detailed Description in conjunction with the accompanying drawings, in which:

FIG. 6 illustrates a sample of data from a hosted PBX system.

FIG. 7 illustrates a sample of data converted by an embodiment of the present invention into an organized structure.

DETAILED DESCRIPTION OF THE INVENTION

Figure 1:
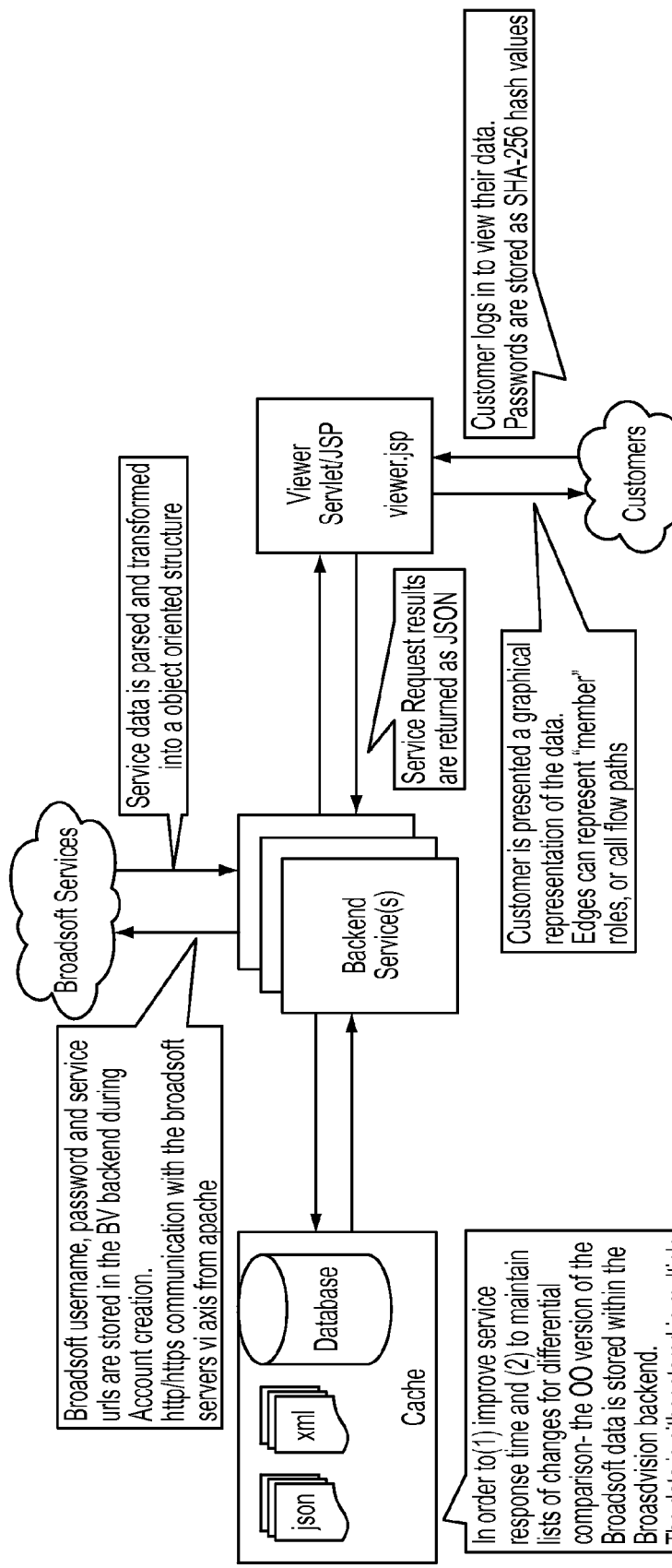
FIG. 1 illustrates a high level diagram of an embodiment of the present invention.
Figure 3:
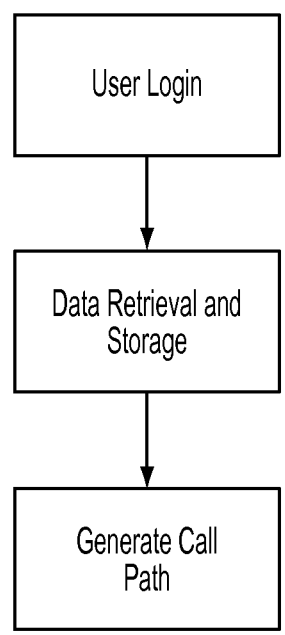
FIG. 3 illustrates a high level diagram of an embodiment of the method of the present invention.

Referring now to the drawings, wherein like reference numerals refer to like parts throughout, FIG. 1 illustrates a high level diagram of an embodiment of the present invention. Referring to FIG. 3, the embodiment of the present invention comprises a system 002 for querying and receiving data from a hosted PBX system (in the present embodiment, Broadsoft Services) and organizing the received data in a way that can be displayed to and easily modified by a customer.

As shown in FIG. 1, system 002 is embodied as a web-based application, and generally comprises three parts: backend services 004, a viewer 006, and a cache 008. Backend services 004 represents a collection of program modules/services conducted by the backend. Broadly speaking, backend services 004 queries hosted PBX system 010 (for example, for data such as all users, auto attendants, hunt groups, call centers, and devices. In the preferred embodiment, backend services 004 next parses all received data and transforms the data into an object oriented structure. In an alternative embodiment, any structure for storing information in memory known in the art may be used; memory refers to the physical devices used to store programs (sequences of instructions) or data (e.g. program state information) on a temporary or permanent basis for use in a computer or other digital electronic device. The data, now in an object oriented structure, is stored within cache 008 for quick response times, as well as to maintain a list of changes for differential comparison. The cache may consist of JSON files, XML files, a database, or any other equivalent storage unit known in the art.

As shown in FIG. 1, system 002 may be embodied as a web-based application; however, in alternative embodiment system 002 may exist as a local application. According to the embodiment in shown in FIG. 1, a customer, using a browser, will log in to system 002 via viewer 004. In the present embodiment, viewer 004 is comprised of a servlet/JSP architecture. Viewer 004 may prompt the user for an ID and password. Passwords may be stored as SHA-256 hash values, or alternatively as any other cryptographic hash function or encryption known in the art. In one embodiment, once a customer has logged into system 002, the customer will be presented with a graphic interface representing the structure of the PBX system, generated from the data stored in the cache.

Figure 2:
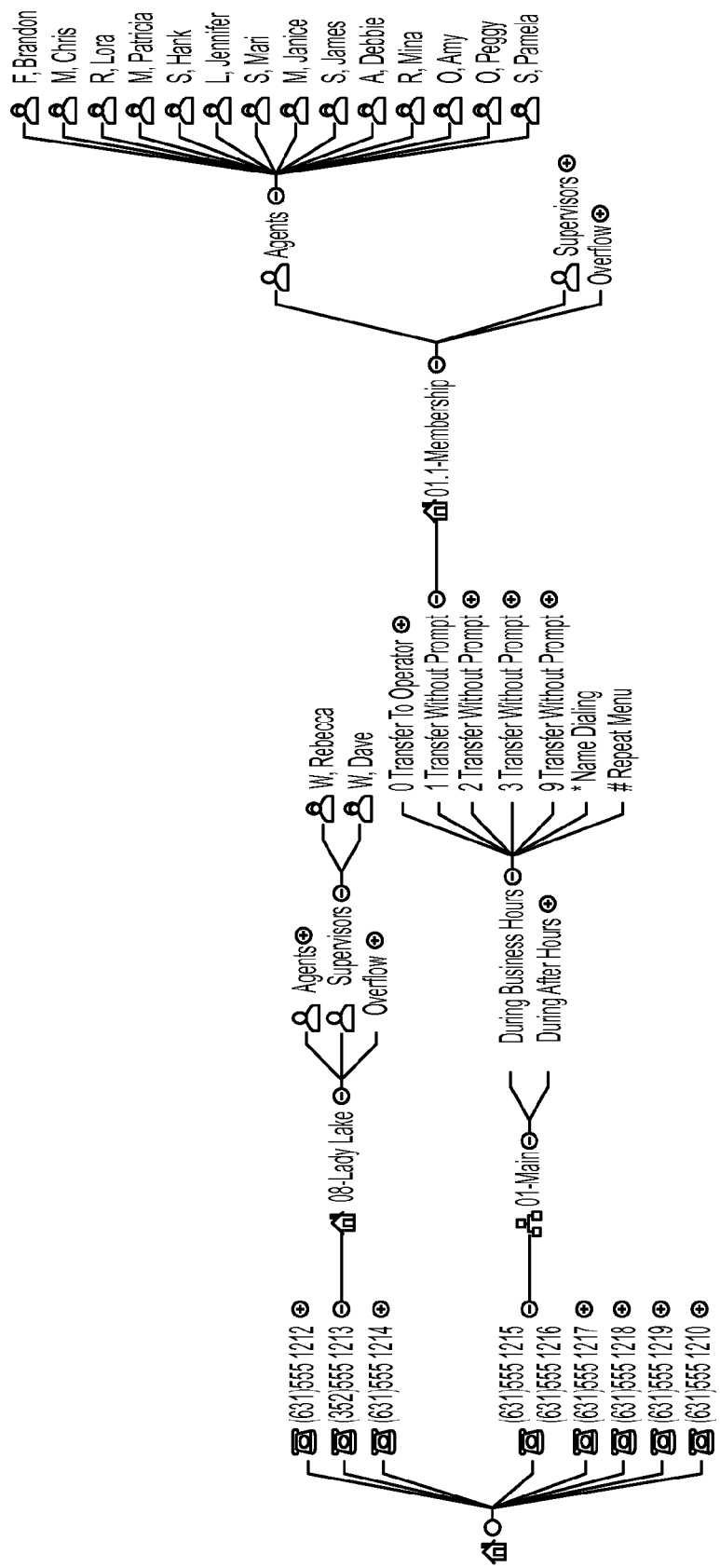
FIG. 2 illustrates an embodiment of the graphical user interface generated by an embodiment of the present invention.

FIG. 2 shows an embodiment of the present graphic interface. Although FIG. 2 depicts the interface as a tree structure, any other structure or format could be used. Displaying the structure of the private branch exchange greatly enhances the usability of a PBX system.

System 002, its methods, and alternative embodiments of both, are described in detail below. FIG. 3 shows a high-level flow chart of an embodiment of a method of the present invention. FIG. 3 shows three broad steps: (1) initial user log on step; (2) data retrieval and storage step; (3) generate call path step.

Figure 4:
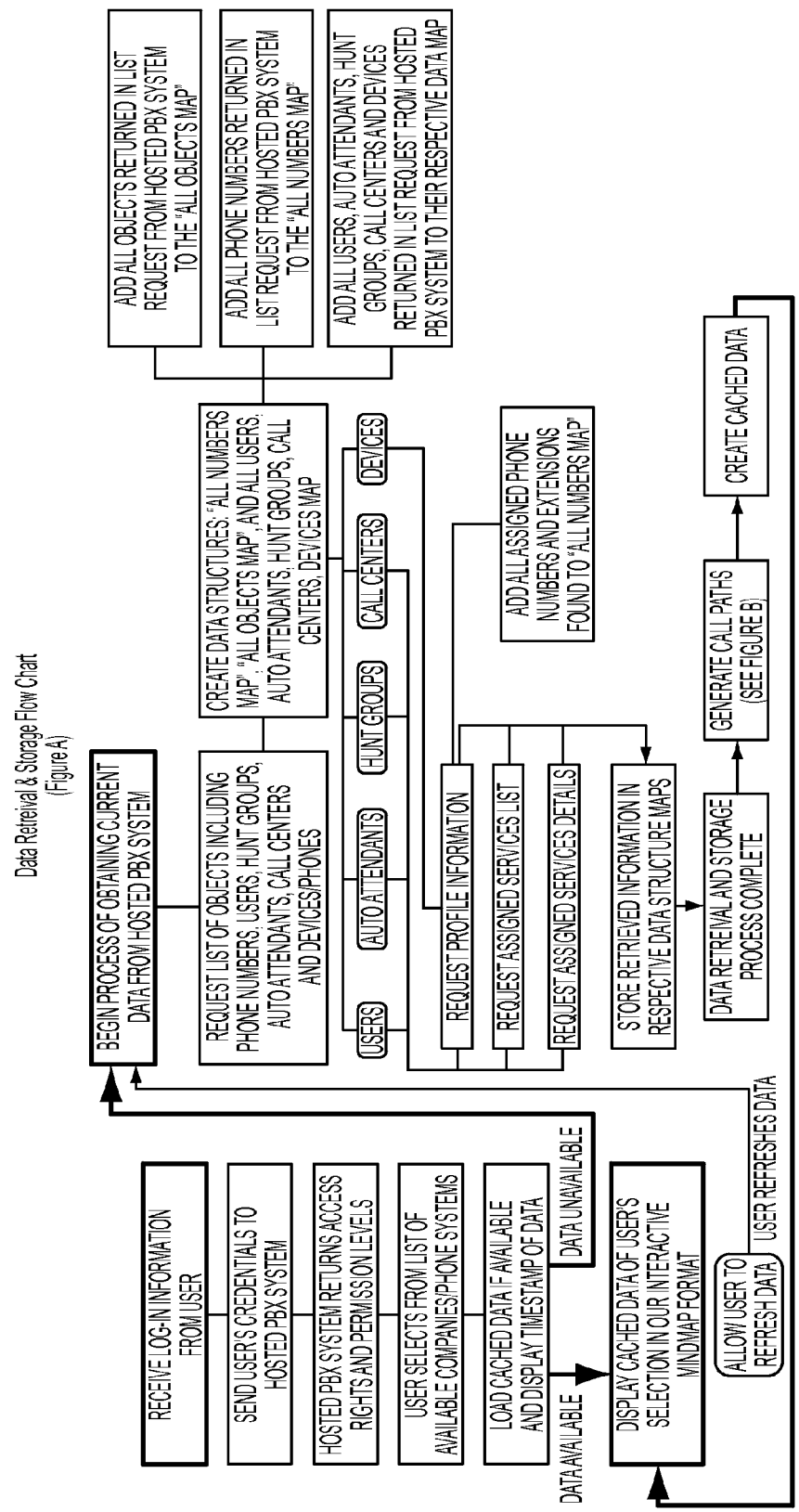
FIG. 4 illustrates a diagram of an embodiment of the method of the present invention.

FIG. 4 shows a flow chart of an embodiment of the login step. Once the user enters his or her ID and password, backend services 004 sends the user's credentials to hosted PBX system 010. Hosted PBX system 010 returns access rights and permission levels to backend services 004. Next, viewer 006 directs user's interface to display a list of available companies/phone systems for user to select from. Once the user selects a particular company/phone system, backend services 004 checks cache 006 to ascertain whether the data for that company/phone system has been cached from a prior session. If the data has not been stored from a prior session, or was not stored from a recent prior session, backend services 004 may automatically refresh the data. If the data has been stored from a recent prior session, viewer 004 will display the most recent cached version of the data; however, the user will be given the option to refresh the data if he or she chooses.

If the user elects to refresh or a refresh is required, backend services 004 begins the process of obtaining current data from hosted PBX system 010. First, a list of data is requested from hosted PBX system 010, which typically includes phones numbers, users, auto attendants, hunt groups, call centers, and physical phones and devices. Next a database framework is created for storing the data received from hosted PBX systems 010. Once the data is received and parsed from hosted PBX systems 010, backend services 004 stores the data into one of two categories: All Numbers Map and All Objects Map. All Numbers Map stores all number data received from hosted PBX system 010. All Objects Map is comprised of at least five distinct categories: (1) users, (2) auto attendants, (3) hunt groups, (4) call centers, and (5) devices. All data stored in the All Objects Map is put within its respective category. Next, for each object stored in the database, backend services 004 iteratively requests profile information, assigned services list, and assigned services detail. These requests continue until all data from hosted PBX system 010 is retrieved for every object and stored in the database.

Figure 5:
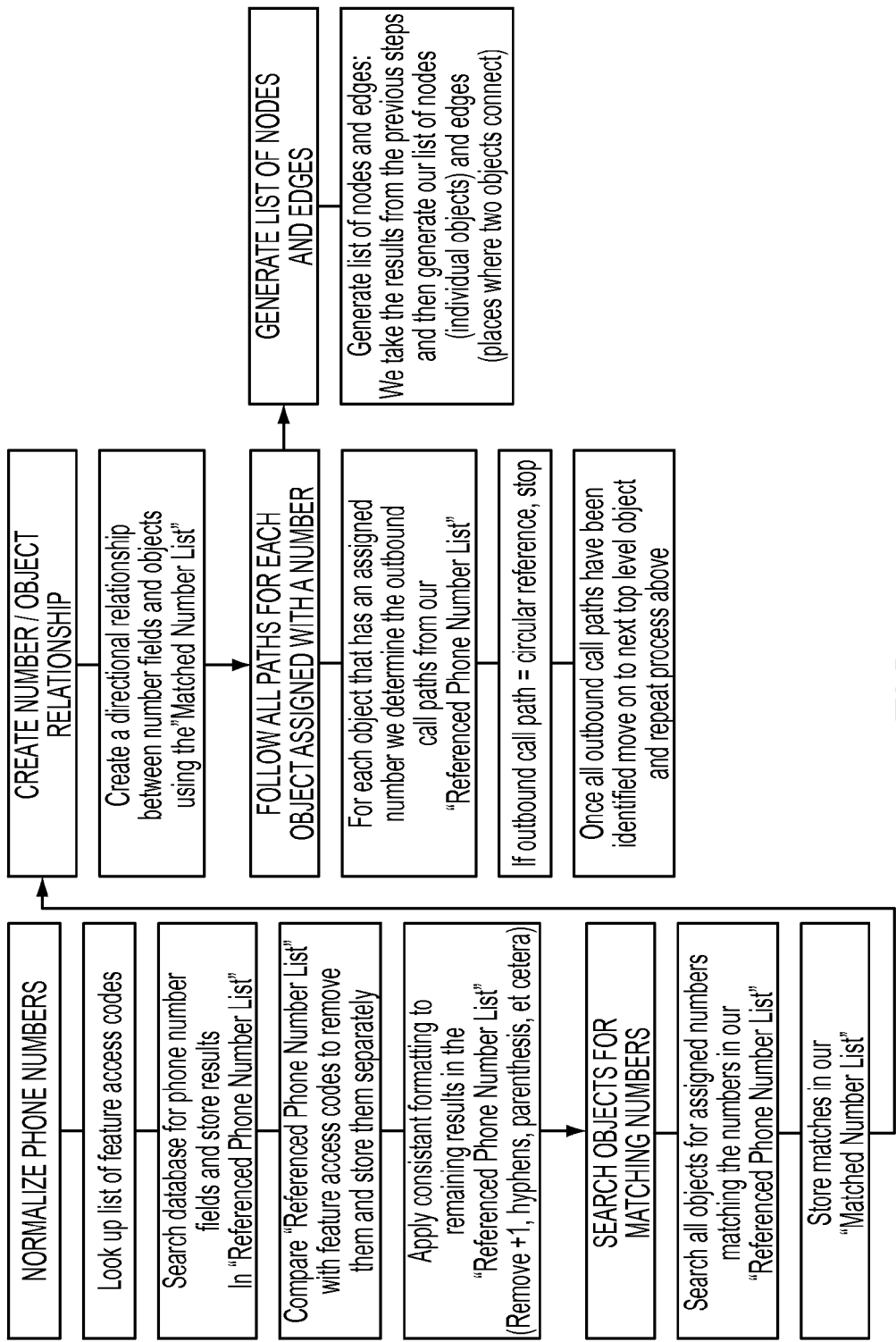
FIG. 5 illustrates a diagram of an embodiment of the method of the present invention.

FIG. 5 illustrates a flowchart of an embodiment of the next broad sequence of steps for generating call paths between the objects stored in the prior step. First, all phone numbers must be stored in the database with consistent formatting. Hosted PBX systems often store phone numbers in a variety of formats—numbers can be stored with or without dashes, area codes, etc. Often hosted PBX systems will even store feature access codes, such as *69, with the numbers. In order to be used in a system that enables call flow, numbers must first be identified and then normalized to fit a specific format structure. To accomplish this, backend services 004 first looks up the list of feature access codes. Next, the database is searched for phone number fields, and all found fields are stored in a "Referenced Phone Number List." The feature access codes are then searched for and removed from the "Reference Phone Number List," leaving only the numbers. Finally, the remaining numbers are then given a consistent formatting scheme by removing any "+1," hyphens, parenthesis, etc. For example, backend services 004 first looks up a list of feature access codes, and finds one to be *55. Next, "Reference Phone Number List" is cross-referenced for the feature access code *55. If an option on the main auto attendant is *556315551212, the number is stripped of *55, reformatted simply as 6315551212 and stored again in "Reference Phone Number List".

Once the data is formatted consistently, backend services 004 must generate connections between the objects stored in the database. For example, if auto attendant is automatically directing all phone calls to the voicemail of a device within the network, a connection will need to be made between the auto attendant and the device that the auto attendant is directing calls to. The first step of this process is to search each object stored in the database for each number stored in the "Reference Phone Number List." Each object that contains a particular number in the "Reference Phone Number List" is grouped, together with that number, in the "Matched Number List." In conducting its search, backend services 004 first searches for the extension, then the full number, and finally the partial number. For example, first the database is searched for each number in the "Reference Phone Number List" beginning with 6315551212. Next, once a device having the assigned number of 6315551212 is found, and an auto attendant is found with an option of 6315551212, both are added with the number to "Matched Number List."

Once the "Matched Number List" is created, backend services 004 uses "Matched Number List" to search the database for each object that contains a number belonging to another object and creates a directional relationship between the two. For example, if an object is found with assigned number or extension matching 6315551212, and an auto attendant with the option *556315551212 is also found, a directional relationship is created between the two. Next, backend services 004 follows all paths for each object assigned with a number. Backend services 004 starts with the first object that has an assigned phone number and then, using the "Referenced Phone Number List," follows the outbound call paths from the object until it reaches the end of the call path or a circular reference. Backend services 004 repeats this process for each top level object. Finally, using the previous steps, a list of nodes and edges are generated. Nodes represent individual objects and edges represent where two objects connect. In the preferred embodiment, the list of nodes and edges are the final format used to generate an interactive format (in the present embodiment, a mindmap) that can be easily understood and altered.

In the preferred embodiment, during the broad step of generating call paths, an output as GoJS readable JSON file is generated and used for the front end visual interface to display the interactive format. Every time data is retrieved or a connection is made, it is stored in a format readable by GoJS. In an alternative embodiment, the data is stored in XML files or mapped into a database. In an alternative embodiment, all data is stored in a separate step, after the call paths have been generated.

Although the present invention has been described in connection with a preferred embodiment, it should be understood that modifications, alterations, and additions can be made to the invention without departing from the scope of the invention as defined by the claims.

What is claimed is:

1. A system for mapping and displaying a hosted private branch exchange, comprising:
   a. a first database in which data representative of the hosted private branch exchange is stored;
   b. a communications module that permits a user to request data from said first database;
   c. a computer memory in which data requested from said first database is stored, wherein said requested data comprises data representative of phone numbers, users, auto attendants, hunt groups, call centers, and physical phones and devices;
   d. a data management processor configured to perform the steps of:
      i. parsing and storing the data requested from the first database into first and second maps, said second map comprising a plurality of distinct categories in which objects representative of predetermined data are assigned;
      ii. generating call paths between said objects;
      iii. generating logical connections between said objects;
      iv. creating directional relationships between pairs of said objects; and
      v. generating an interactive map; and
   e. a graphical interface in communication with said computer memory and adapted to provide a visual representation of said interactive map.

2. The system for mapping a hosted private branch exchange according to claim 1, wherein said data management module further provides the function of transforming the data requested from the first database into an object oriented structure.

3. The system for mapping a hosted private branch exchange according to claim 2, wherein said object oriented data structures are stored in said computer memory as any one of: JSON files, XML files, and a second database.

4. The system for mapping a hosted private branch exchange according to claim 1, wherein said first map is an all numbers map that stores number data received from said first database.

5. The system for mapping a hosted private branch exchange according to claim 1, wherein said second map is an all objects map.

6. The system for mapping a hosted private branch exchange according to claim 5, wherein said plurality of distinct categories of data stored in said all objects map comprise: users, auto attendants, hunt groups, call centers, and devices.

7. A computer-implemented method for mapping and displaying a private branch exchange, the data representative of which is stored in a first database, the method comprising the steps of:
   a. receiving a request from a user for data from said first database;
   b. storing said requested data in a computer memory;
   c. parsing and storing, by a processor, the data requested from the first database into first and second maps, wherein said second map comprises a plurality of distinct categories in which objects representative of predetermined data are assigned;
   d. generating, by the processor, call paths between said objects;
   e. generating, by the processor, logical connections between said objects;
   f. creating, by the processor, directional relationships between pairs of said objects;
   g. generating, by the processor, an interactive map; and
   h. displaying a visual representation of said interactive map on a graphical interface that is in communication with said computer memory.

8. The method for mapping a private branch exchange according to claim 7, comprising the further step of transforming said data into object oriented structures after the step of parsing the data.

* * * * *